US012654450B2

(12) United States Patent
Yoshida

(10) Patent No.: US 12,654,450 B2
(45) Date of Patent: Jun. 16, 2026

(54) INKJET RECORDING APPARATUS INCLUDING CAP ATTACHABLE TO NOZZLE SURFACE OF RECORDING HEAD

(71) Applicant: KYOCERA Document Solutions Inc., Osaka (JP)

(72) Inventor: Takeru Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 124 days.

(21) Appl. No.: 18/731,636

(22) Filed: Jun. 3, 2024

(65) Prior Publication Data

US 2024/0408873 A1 Dec. 12, 2024

(30) Foreign Application Priority Data

Jun. 7, 2023 (JP) ................................ 2023-093868

(51) Int. Cl.
*B41J 2/165* (2006.01)

(52) U.S. Cl.
CPC ........ *B41J 2/16514* (2024.05); *B41J 2202/03* (2013.01)

(58) Field of Classification Search
CPC ................ B41J 2/16514; B41J 2202/03; B41J 2/16508; B41J 2/16532; B41J 2/1652; B41J 2/16505
See application file for complete search history.

(56) References Cited

U.S. PATENT DOCUMENTS 10,071,555 B2 * 9/2018 Nakazawa ........... B41J 2/16526
2008/0143778 A1 * 6/2008 Sugiyama ............ B41J 2/16508 347/23
2013/0182036 A1 7/2013 Park ................................ 347/30
2024/0326446 A1 * 10/2024 Kurashina ............ B41J 2/16547

FOREIGN PATENT DOCUMENTS

JP 2012-035501 A 2/2012
JP 2013-144411 A 7/2013

* cited by examiner

*Primary Examiner* — Bradley W Thies
(74) *Attorney, Agent, or Firm* — Stein IP, LLC

(57) ABSTRACT

An inkjet recording apparatus includes a recording head arranged so that a nozzle surface thereof is inclined, a conveyance unit, a cap, a suction portion, and a control portion. The cap includes a bottom surface and side walls provided to stand along four sides of the bottom surface. In detaching the cap from the nozzle surface, the control portion sequentially executes a first release operation in which, in a state where a lower positioned one of the side walls is in contact with the nozzle surface, others of the side walls are released from the nozzle surface, a wiping operation in which, while the lower positioned one of the side walls is kept in contact with the nozzle surface, the cap is moved upward along the nozzle surface, and a second release operation in which all the side walls of the cap are released from the nozzle surface.

5 Claims, 6 Drawing Sheets

INKJET RECORDING APPARATUS INCLUDING CAP ATTACHABLE TO NOZZLE SURFACE OF RECORDING HEAD

INCORPORATION BY REFERENCE

This application is based upon and claims the benefit of priority from Japanese Patent Application No. 2023-93868 (filed on Jun. 7, 2023), the entire contents of which are incorporated herein by reference.

BACKGROUND

The present disclosure relates to an inkjet recording apparatus.

Conventionally, in inkjet recording apparatuses such as an inkjet printer, when a printing operation is not performed for a long period of time, ink in nozzles of a recording head might dry to cause an ink ejection failure. In order, therefore, to suppress drying of the ink, a capping operation of attaching a flat box-shaped member referred to as a cap to a nozzle surface is performed to seal a vicinity of the nozzles, and an interior of such a sealed space is maintained at high humidity.

When the printing operation is repeatedly performed, however, a foreign substance or the like may adhere to the nozzles, causing defective ink ejection. As a solution thereto, there is a technique, a so-called suction purge, in which, by a suction unit communicating with an interior of the cap capping the nozzle surface, suction is applied to the interior of the sealed space between the cap and the nozzle surface so that the ink is forcibly discharged together with the foreign substance from the nozzles.

Meanwhile, particularly in inkjet recording apparatuses of a type requested to achieve a size reduction and space saving, from a viewpoint of a layout relationship with a recording medium to be conveyed, the recording head may be arranged so as to be inclined with respect to a horizontal plane so that ink is ejected therefrom at an angle inclined from vertical toward horizontal. When the recording head mounted in such an inclined state is subjected to the suction purge, residual ink that is a part of the ink discharged into the cap and remains not sucked by the suction unit may accumulate at an inner lower end of the cap.

As a result, when the cap is detached at a time of printing, the residual ink might remain in an area where the cap had been in contact with the nozzle surface and run down under gravity to adhere to side surfaces of the recording head. As the ink adheres to and builds up on the side surfaces of the recording head, the ink might drip on and contaminate a sheet conveyance path. Furthermore, when the ink dries on the side surfaces of the recording head and solidifies to adhere thereto, the nozzle surface can no longer be sealed with the cap depending on a shape of the cap, in which case the recording head needs to be cleaned or replaced.

SUMMARY

An inkjet recording apparatus according to an aspect of the present disclosure includes a recording head, a cap, a suction portion, and a control portion. The recording head has a nozzle surface in which a plurality of nozzles for ejecting ink are formed. The cap is detachably attached to the nozzle surface of the recording head. The suction portion performs a suction purge process of applying suction to a sealed space between the cap attached to the nozzle surface and the nozzle surface so that the ink in the plurality of nozzles is sucked out. The control portion controls an operation of attaching the cap to the nozzle surface and detaching the cap therefrom. The recording head is arranged so that the nozzle surface is inclined with respect to a horizontal plane. The cap includes a rectangular bottom surface that is to be opposed at a prescribed distance to the nozzle surface and side walls that are provided to stand along four sides of the bottom surface and make contact at distal end parts thereof with the nozzle surface. In detaching the cap from the nozzle surface, the control portion sequentially executes a first release operation in which, in a state where a lower positioned one of the side walls of the cap is in contact with the nozzle surface, others of the side walls of the cap are released from the nozzle surface, a wiping operation in which, while the lower positioned one of the side walls of the cap is kept in contact with the nozzle surface, the cap is moved upward by a prescribed amount along the nozzle surface, and a second release operation in which all the side walls of the cap are released from the nozzle surface.

DETAILED DESCRIPTION

1. Configuration of Inkjet Recording Apparatus

Figure 1:
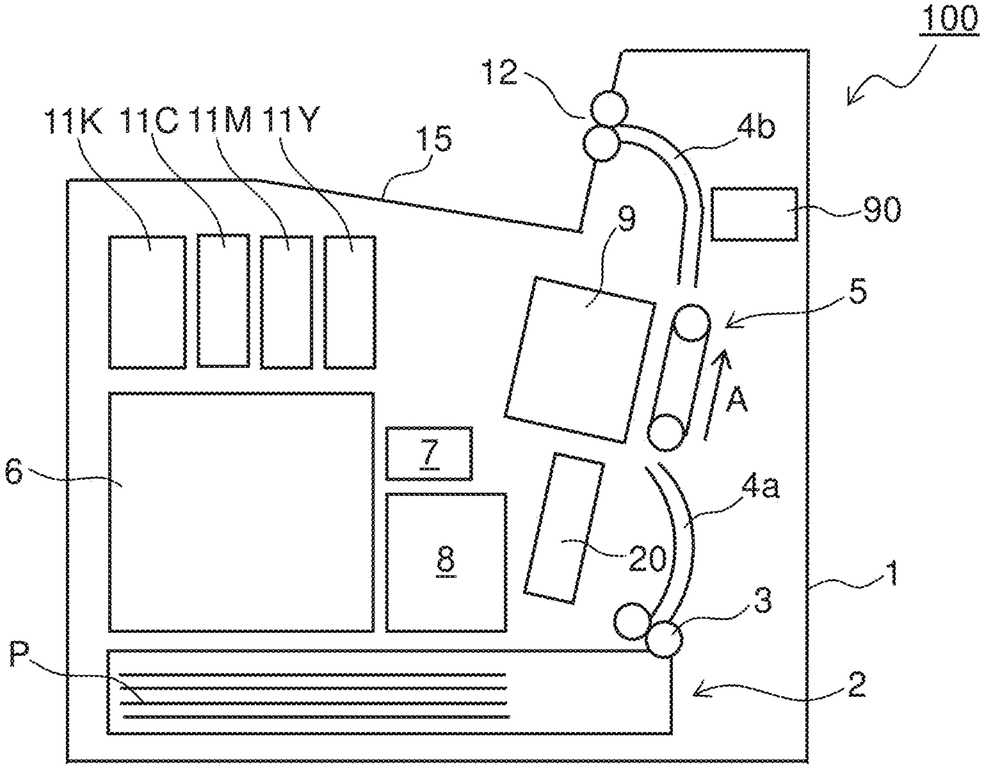
FIG. 1 is an explanatory view showing a schematic configuration of a printer as an inkjet recording apparatus according to an embodiment of the present disclosure.

With reference to the appended drawings, the following describes embodiments of the present disclosure. FIG. 1 is an explanatory view showing a schematic configuration of a printer 100 as an inkjet recording apparatus according to an embodiment of the present disclosure. The printer 100 includes a paper feed cassette 2 that is a sheet housing portion. The paper feed cassette 2 is arranged in a lower part of a printer main body 1. A sheet P as an example of a recording medium is housed inside the paper feed cassette 2.

A paper feed portion 3 is arranged downstream from the paper feed cassette 2 (on an upper right side of the paper feed cassette 2 in FIG. 1) in a sheet conveyance direction (hereinafter, referred to simply as a conveyance direction). The paper feed portion 3 is formed of, for example, a paper feed roller pair composed of a feed roller and a retard roller. By the paper feed portion 3, the sheet P housed in the paper feed cassette 2 is fed out one by one separately toward downstream in the conveyance direction.

A first sheet conveyance path 4*a* is provided inside the printer 100. The first sheet conveyance path 4*a* is located on the upper right side of the paper feed cassette 2, i.e., downstream from the paper feed cassette 2 in the conveyance direction. Via the first sheet conveyance path 4*a*, the sheet P fed out from the paper feed cassette 2 is conveyed substantially perpendicularly upward along a side surface of the printer main body 1.

A conveyance unit 5 and a recording head 9 are arranged at a downstream end of the first sheet conveyance path 4*a* in the conveyance direction. The sheet P fed out from the paper feed cassette 2 passes through the first sheet conveyance path 4*a* to reach the conveyance unit 5.

The recording head 9 is arranged so as to be inclined at a prescribed angle with respect to a horizontal plane. The conveyance unit 5 is arranged opposite and at a prescribed distance from a nozzle surface 9*a* (see FIG. 5) of the recording head 9 and conveys the sheet P along the nozzle surface 9*a*. The nozzle surface 9*a* has numerous nozzles for ejecting ink (not shown) formed therein. Based on a control signal from a control portion 90, the recording head 9 ejects ink to the sheet P in accordance with image data received from an external computer, and thus an image is recorded (printed) on the sheet P. While FIG. 1 shows the single recording head 9, one or more recording heads 9 are actually provided so as to correspond to each of different colors of yellow, magenta, cyan, and black.

Ink containers 11Y, 11M, 11C, and 11K store ink of the different colors of yellow (Y), magenta (M), cyan (C), and black (B), respectively. An ink supply system 6 is composed of an ink supply path, a pump, an open/close valve, a check valve (none of which are shown), and so on. Based on a control signal from the control portion 90, the ink supply system 6 supplies the recording head 9 with ink of a corresponding one of the four different colors (yellow, cyan, magenta, and black) stored in the ink containers 11Y to 11K, respectively.

In the sheet conveyance direction (an arrow A direction), a second sheet conveyance path 4*b* is provided downstream from the conveyance unit 5 (on an upper side in FIG. 1). The sheet P on which the image has been recorded by the recording head 9 passes through the second sheet conveyance path 4*b* to be discharged to a discharge tray 15 provided on an upper surface of the printer 100 via a discharge portion 12 formed of a discharge roller pair.

A cap 20 is arranged below the recording head 9. While FIG. 1 shows the single cap 20, there are actually prepared an equal number of caps 20 to the number of the recording heads 9 arranged so as to correspond to the ink of the four different colors.

In the printer 100, in order to eliminate dried and thickened ink, a foreign substance, and so on from inside the nozzles of the recording head 9, at a start of printing after a long-term suspension and during intervals between printing operations, there is executed, in preparation for a subsequent printing operation, a suction purge process in which, in a state where the cap 20 is attached to the nozzle surface 9*a*, a suction pump 7 applies suction to a space (a sealed space) between the nozzle surface 9*a* and the cap 20 so that the ink is forcibly sucked out from all the nozzles of the recording head 9. The ink (purged ink) sucked out from the nozzles into the cap 20 is discharged to an exterior of the cap 20 by the suction pump 7 and then is collected in a waste ink tank 8 via a waste ink collection flow path (not shown).

Figure 2:
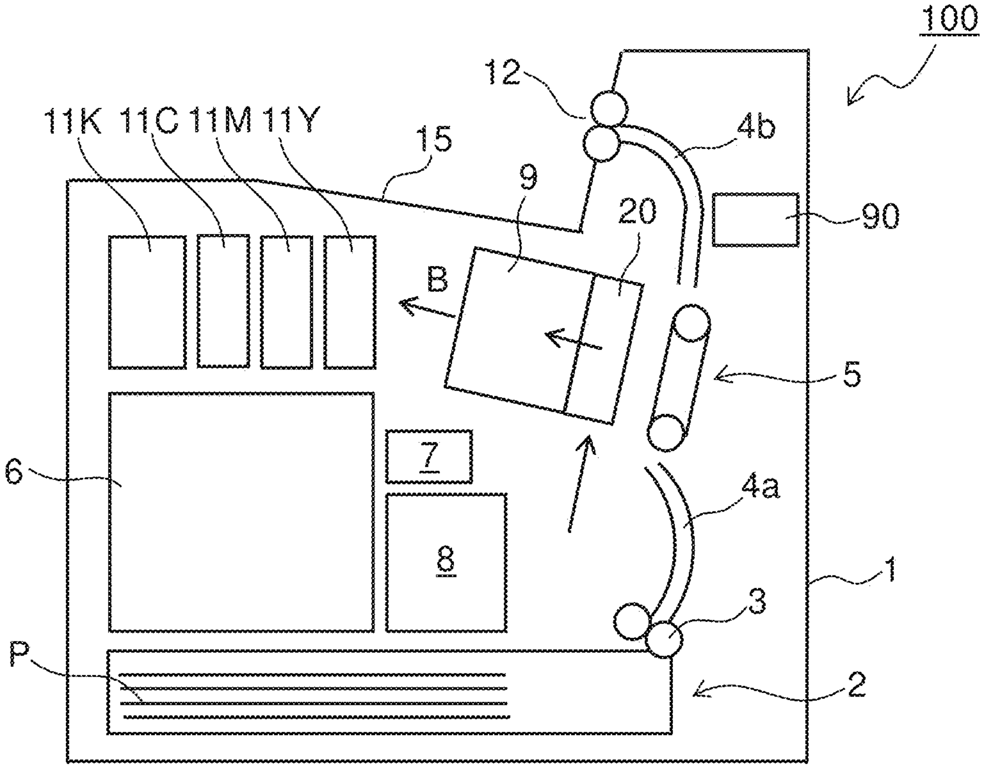
FIG. 2 is a sectional side view showing a state where a cap is attached to a recording head in the printer shown in FIG. 1.

FIG. 2 is a sectional side view showing a state where the cap 20 is attached to the recording head 9 in the printer 100 shown in FIG. 1. In a case of not performing a printing operation for a long time, the control portion 90 controls a drive source (not shown) such as a motor to move the recording head 9 in a direction (an arrow B direction) orthogonal to the conveyance direction away from the conveyance unit 5. Next, the control portion 90 controls the cap 20 to move upward from a retracted position (a position shown in FIG. 1) so that the cap 20 is arranged between the recording head 9 and the conveyance unit 5. The cap 20 is moved further in a direction (the arrow B direction) toward the recording head 9 to be attached to the nozzle surface 9*a* of the recording head 9.

Figure 3:
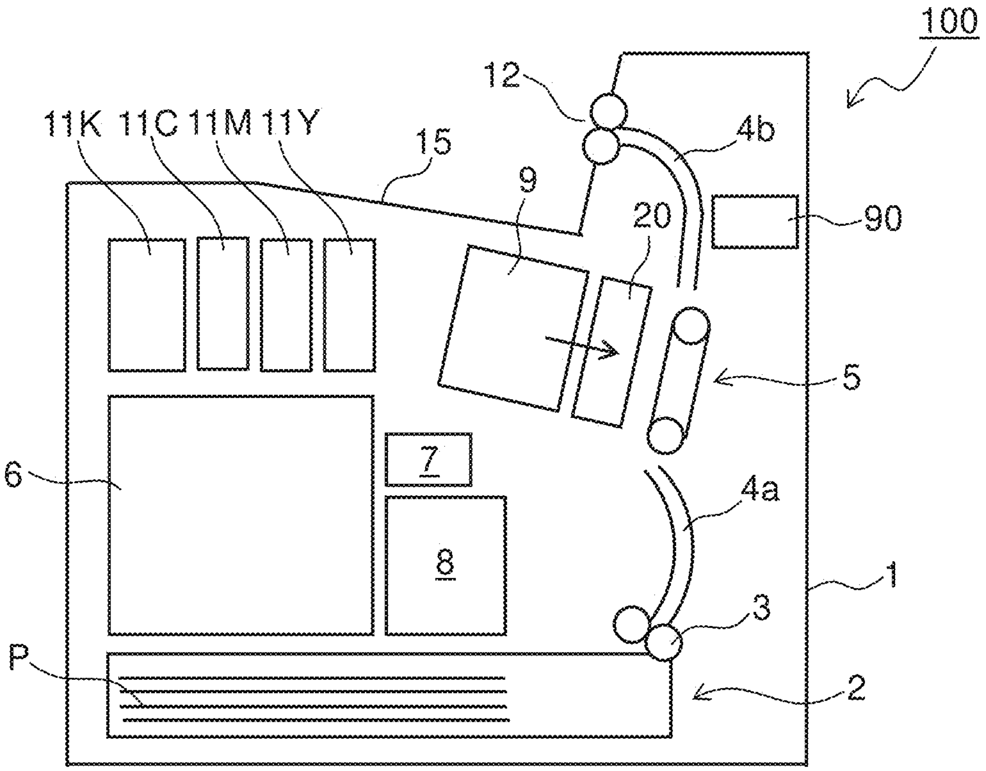
FIG. 3 is a sectional side view showing a state where the cap is detached from the recording head in the printer shown in FIG. 2.

FIG. 3 is a sectional side view showing a state where the cap 20 is detached from the recording head 9 in the printer 100 shown in FIG. 2. In a case of performing a printing operation from the state shown in FIG. 2, the control portion 90 controls the cap 20 to move in a direction away from the recording head 9 (an opposite direction to the arrow B direction) so that the cap 20 is detached from the nozzle surface 9*a* of the recording head 9. After that, the control portion 90 controls the cap 20 to move back to the retracted position and the recording head 9 to move in a direction toward the conveyance unit 5 (the opposite direction to the arrow B direction) so that a return is made to the state shown in FIG. 1.

2. Configuration of Cap

Figure 4:
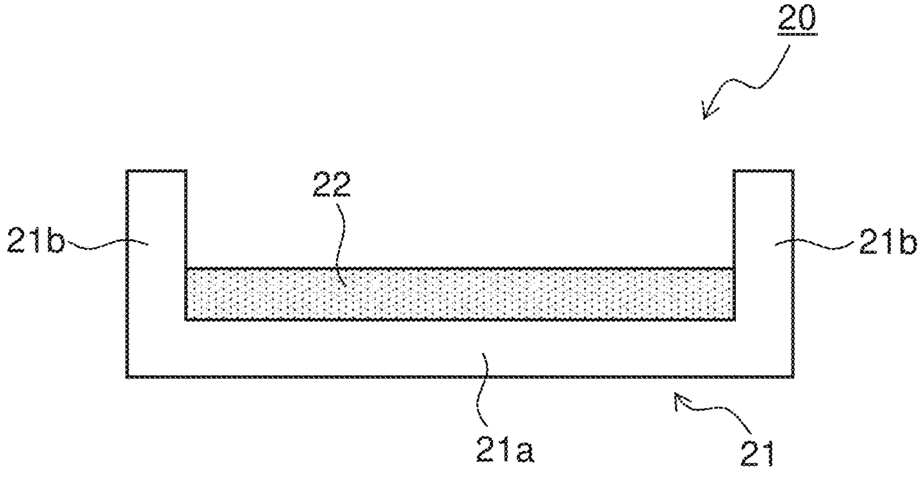
FIG. 4 is a sectional side view of a cap used in a printer according to a first embodiment of the present disclosure.

Next, a description is given of a configuration of the cap 20. FIG. 4 is a sectional side view of a cap 20 used in a printer 100 according to a first embodiment of the present disclosure. The cap 20 includes a main body 21 and an ink absorber 22. The main body 21 has a flat rectangular parallelepiped shape with an open top surface and includes a rectangular bottom surface 21*a* that is to be opposed at a prescribed distance to a nozzle surface 9*a* (see FIG. 5) and side walls 21*b* provided to stand along four sides of the bottom surface 21*a*. The main body 21 is integrally formed using an elastic material such as, for example, rubber.

The ink absorber 22 is arranged on an inner side of the main body 21 along the bottom surface 21*a*. The ink absorber 22 is made of a porous material such as, for example, sponge. Though not shown herein, the cap 20 is provided with a suction port to which a suction pump 7 is connected and an air releasing valve for establishing or blocking communication between an interior and an exterior of the cap 20 so that the interior of the cap 20 is switched between a sealed state and an air releasing state (neither of which is shown).

Figure 5:
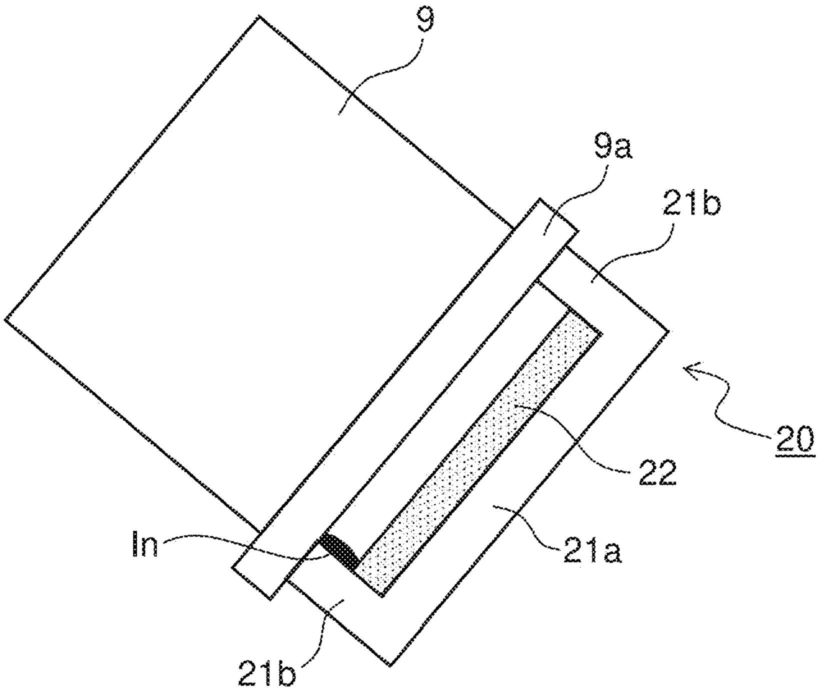
FIG. 5 is a sectional side view showing a state where a cap is attached to a recording head in the printer of the first embodiment.

FIG. 5 is a sectional side view showing a state where the cap 20 is attached to a recording head 9 in the printer 100 of the first embodiment. As shown in FIG. 5, in the state where the cap 20 is attached to the recording head 9, distal ends of the side walls 21*b* formed along the four sides of the main body 21 are in intimate contact with the nozzle surface 9*a*. Thus, between the nozzle surface 9*a* and the cap 20, a sealed space is formed to suppress an increase in viscosity of the ink in nozzles formed in the nozzle surface 9*a*.

Furthermore, the recording head 9 is inclined, and thus the cap 20 is attached thereto also in an inclined state along the inclined nozzle surface 9*a*. For this reason, ink In remaining unabsorbed by the ink absorber 22 accumulates near a lower end of the cap 20.

3. Operation of Detaching Cap from Recording Head

Figure 6:
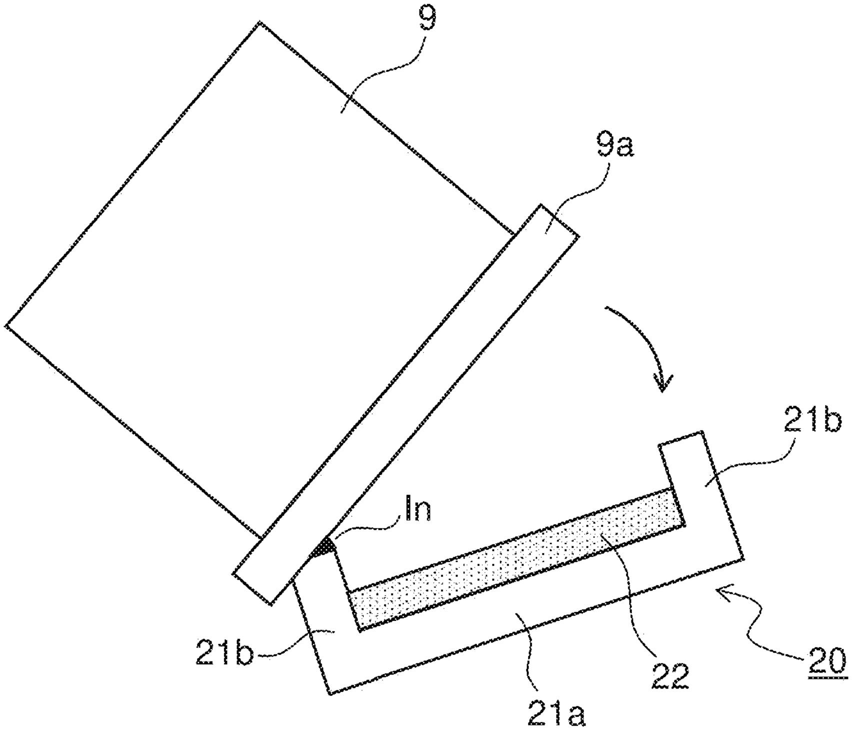
FIG. 6 is a sectional side view showing a state where, from the state shown in FIG. 5, while a lower positioned one of side walls of the cap is kept in contact with a nozzle surface, others of the side walls have been released from the nozzle surface.

Next, a detailed description is given of an operation of detaching the cap 20 from the recording head 9. FIG. 6 is a sectional side view showing a state where, from the state shown in FIG. 5, while a lower positioned one of the side walls 21*b* of the cap 20 is kept in contact with the nozzle surface 9*a*, others of the side walls 21*b* have been released from the nozzle surface 9*a*.

First, as shown in FIG. 6, in a state where the lower positioned one (on a lower left side in FIG. 6) of the side walls 21*b* of the cap 20 makes contact (forms a nip) with the nozzle surface 9*a*, the others of the side walls 21*b* of the cap 20 are released from the nozzle surface 9*a* (a first release operation). At this time, even when there is an accumulation of the ink In (see FIG. 5) remaining unabsorbed by the ink absorber 22 near the lower end of the cap 20, changing (reducing) a degree of inclination of the cap 20 makes it likely that the ink In flows toward the ink absorber 22. As a result, it is possible for the accumulation of the ink In near the lower end of the cap 20 to be absorbed by the ink absorber 22. There still remains, however, a slight amount of ink In at a nip part between the lower positioned one of the side walls 21*b* of the cap 20 and the nozzle surface 9*a*.

Figure 7:
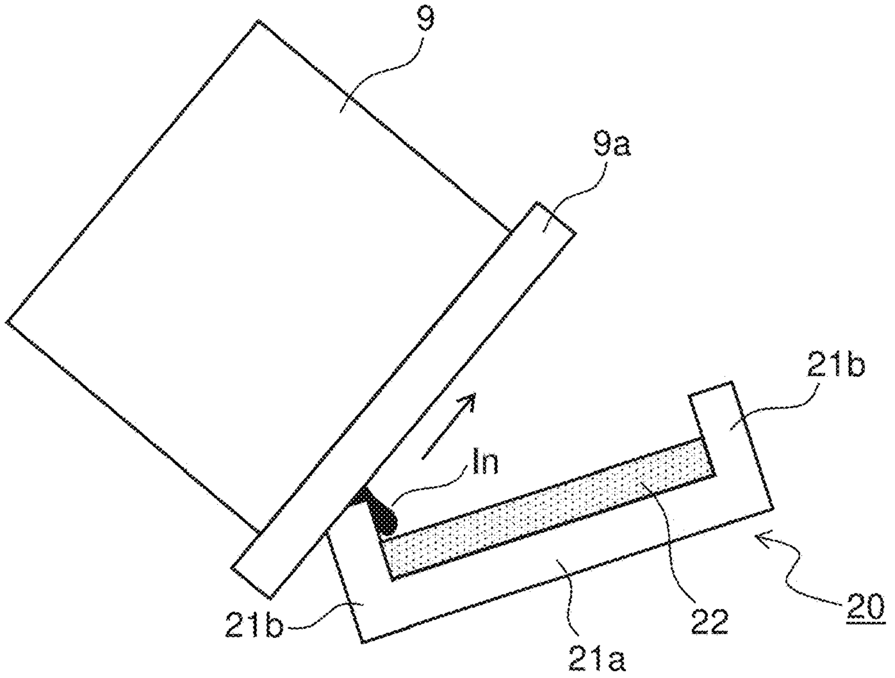
FIG. 7 is a sectional side view showing a state where, from the state shown in FIG. 6, while the lower positioned one of side walls of the cap is kept in contact with the nozzle surface, the cap has been moved upward along the nozzle surface.

FIG. 7 is a sectional side view showing a state where, from the state shown in FIG. 6, while the lower positioned one of the side walls 21*b* of the cap 20 is kept in contact with the nozzle surface 9*a*, the cap 20 has been moved upward along the nozzle surface 9*a*. After execution of the first release operation, as shown in FIG. 7, while the lower positioned one of the side walls 21*b* of the cap 20 makes contact (forms a nip) with the nozzle surface 9*a*, the cap 20 is moved upward by a prescribed amount (for example, about 1 cm) along the nozzle surface 9*a* (a wiping operation). When this operation is performed, the ink adhering to an area of contact on the nozzle surface 9*a* with the lower positioned one of the side walls 21*b* is wiped by the lower positioned one of the side walls 21*b* and flows down together with the ink In that had been remaining at the nip part into the cap 20 along the lower positioned one of the side walls 21*b*.

Figure 8:
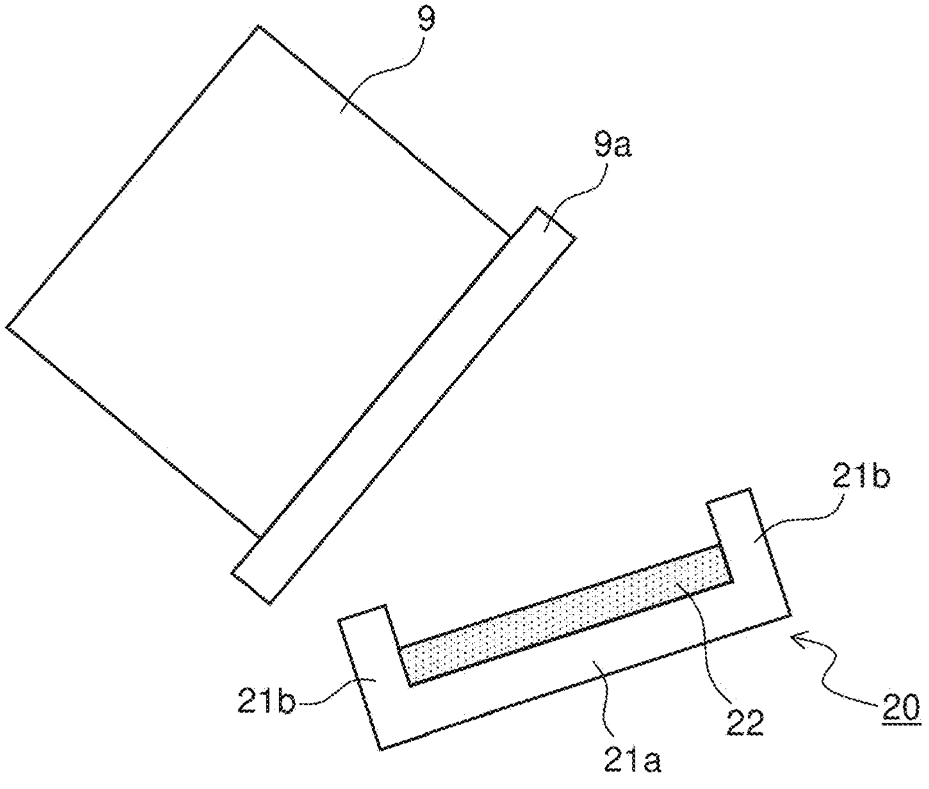
FIG. 8 is a sectional side view showing a state where, from the state shown in FIG. 7, the cap has been completely released from the nozzle surface.

FIG. 8 is a sectional side view showing a state where, from the state shown in FIG. 7, the cap 20 has been completely released from the nozzle surface 9*a*. After execution of the wiping operation, as shown in FIG. 8, all the side walls 21*b* of the cap 20 are released from the nozzle surface 9*a* (a second release operation). A water-repellent film (not shown) made of a fluororesin or the like is formed on the nozzle surface 9*a*, and thus the ink is more likely to adhere to the cap 20 made of rubber than to the nozzle surface 9*a*.

For the above-described reason, even when there remains a small amount of ink In at the nip part between the lower positioned one of the side walls 21*b* of the cap 20 and the nozzle surface 9*a*, most of the ink adheres to the cap 20, and only an insignificant amount of ink remains on the nozzle surface 9*a*. Such an insignificant amount of ink would not run along an inclination of the nozzle surface 9*a* and thus has no possibility of contaminating side surfaces of the recording head 9.

The above-described procedure is followed to detach the cap 20 from the nozzle surface 9*a* of the recording head 9, and thus after the recording head 9 arranged so as to be inclined has been subjected to the suction purge process, it is possible to efficiently collect the ink In into the cap 20 while moving, to a neighborhood of a center of the nozzle surface 9*a*, the ink In adhering to a vicinity of the area of contact on the nozzle surface 9*a* with the lower positioned one of the side walls 21*b* of the cap 20. Thus, it is possible to effectively suppress a phenomenon in which the ink runs over to reach and adhere to the side surfaces of the recording head 9, thus contaminating an interior of the printer 100.

4. Other Configurations of Cap

Figure 9:
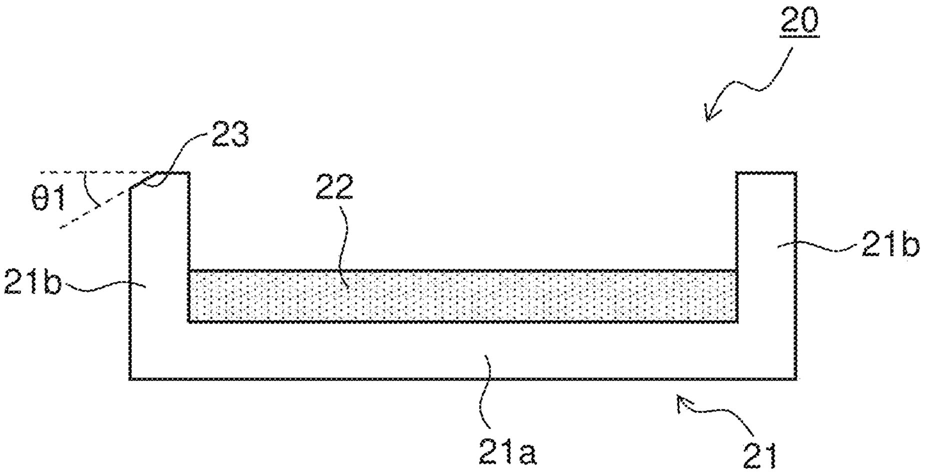
FIG. 9 is a sectional side view of a cap used in a printer according to a second embodiment of the present disclosure.

FIG. 9 is a sectional side view of a cap 20 used in a printer 100 according to a second embodiment of the present disclosure. In this embodiment, one of side walls 21*b* (a left one of the side walls 21*b* in FIG. 9) of the cap 20 positioned at a lower end of the cap 20 when the cap 20 is attached to a recording head 9 has an inclined surface 23 formed at a distal end thereof by downwardly beveling (cutting) an outer corner of the distal end.

Figure 10:
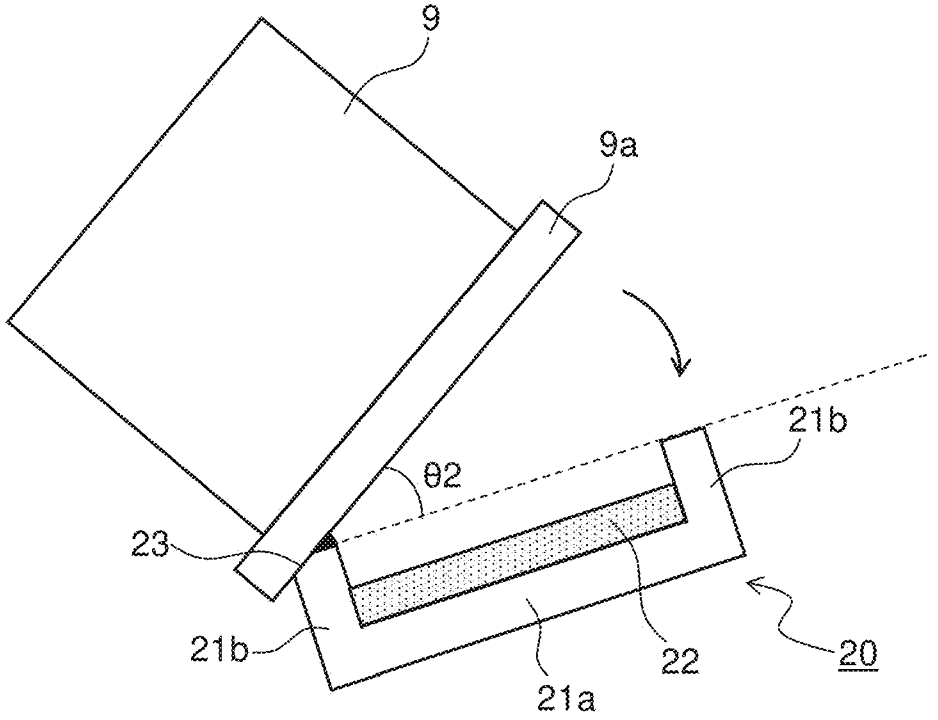
FIG. 10 is a sectional side view showing a state where, from a state where the cap is attached to a recording head in the printer of the second embodiment, while a lower positioned one of side walls of the cap is kept in contact with a nozzle surface, others of the side walls have been released from the nozzle surface.

FIG. 10 is a sectional side view showing a state where, from a state where the cap 20 is attached to the recording head 9 in the printer 100 of the second embodiment, while the lower positioned one of the side walls 21*b* of the cap 20 is kept in contact with a nozzle surface 9*a*, others of the side walls 21*b* have been released from the nozzle surface 9*a*. An angle θ1 (see FIG. 9) of the inclined surface 23 with respect to a horizontal plane is set to be equal to a rotation angle θ2 of the cap 20 when subjected to the first release operation from the state of being attached (the state shown in FIG. 5). For example, in a case where the cap 20 is rotated 20° from the attached state in the first release operation, the angle θ1 of the inclined surface 23 is set to 20°.

This enables, as shown in FIG. 10, reliable planar contact between the nozzle surface 9*a* and the inclined surface 23 after execution of the first release operation. Accordingly, ink In remaining at a nip part between the lower positioned one of the side walls 21*b* of the cap 20 and the nozzle surface 9*a* becomes unlikely to leak through the nip part, and thus it is possible to more effectively suppress the phenomenon in which the ink runs to reach side surfaces of the recording head 9.

Figure 11:
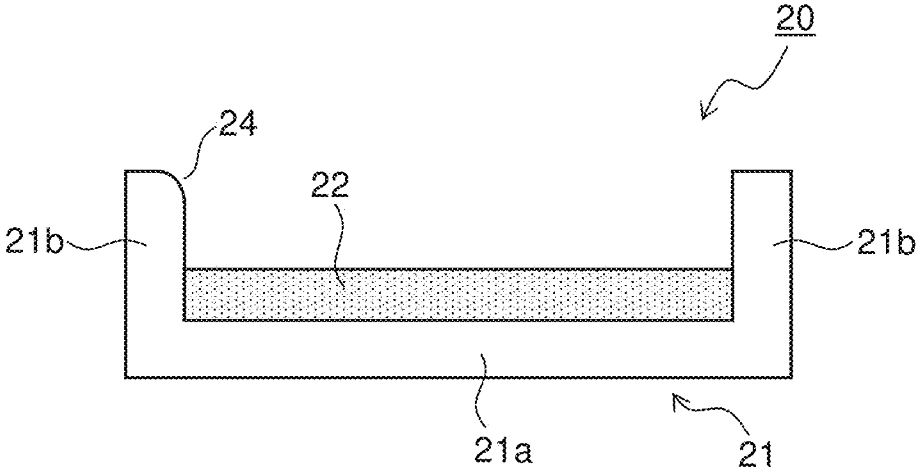
FIG. 11 is a sectional side view of a cap used in a printer according to a third embodiment of the present disclosure.

FIG. 11 is a sectional side view of a cap 20 used in a printer 100 according to a third embodiment of the present disclosure. In this embodiment, one of side walls 21*b* (a left one of the side walls 21*b* in FIG. 11) of the cap 20 positioned at a lower end of the cap 20 when the cap 20 is attached to a recording head 9 has a curved surface 24 formed at a distal end thereof by rounding an inner corner of the distal end into an arc shape (a radiused surface) as viewed in cross section.

Figure 12:
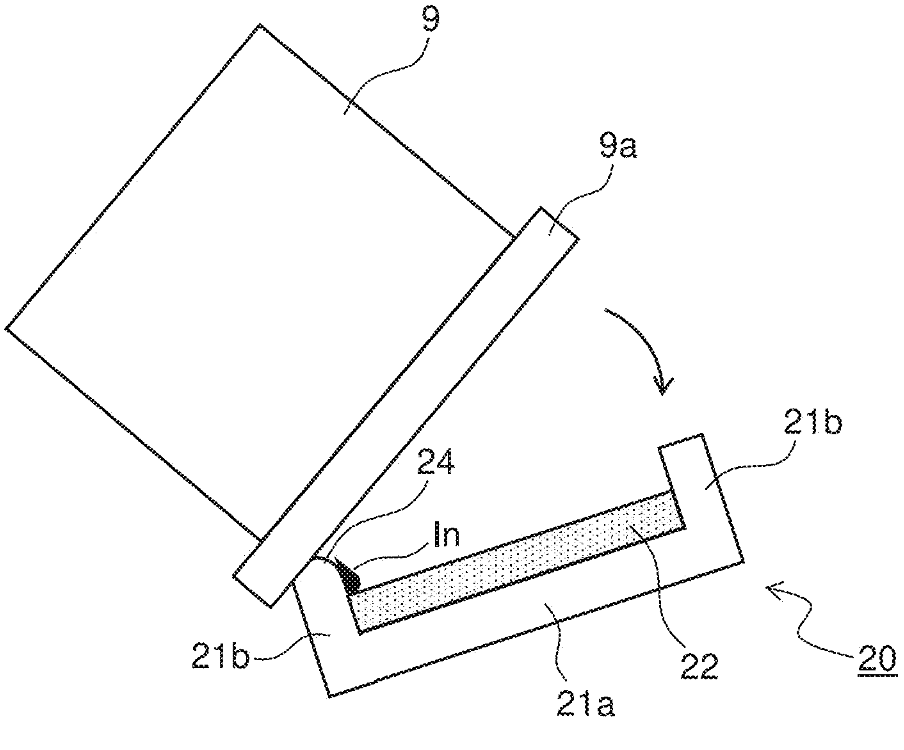
FIG. 12 is a sectional side view showing a state where, from a state where the cap is attached to a recording head in the printer of the third embodiment, while a lower positioned one of side walls of the cap is kept in contact with a nozzle surface, others of the side walls have been released from the nozzle surface.

FIG. 12 is a sectional side view showing a state where, from a state where the cap 20 is attached to the recording head 9 in the printer 100 of the third embodiment, while the lower positioned one of the side walls 21*b* of the cap 20 is kept in contact with a nozzle surface 9*a*, others of the side walls 21*b* have been released from the nozzle surface 9*a*. According to a configuration of this embodiment, in performing the wiping operation, ink In remaining at a nip part between the lower positioned one of the side walls 21*b* of the cap 20 and the nozzle surface 9*a* becomes likely to flow downward along the curved surface 24. As a result, the ink In becomes likely to be collected by an ink absorber 22, and thus it is possible to suppress the phenomenon in which the ink In leaks through the nip part and contaminates side surfaces of the recording head 9.

5. Others

The present disclosure is not limited to the foregoing embodiments and can be variously modified without departing from the spirit of the present disclosure. For example, an inclination angle of the nozzle surface 9*a* of the recording head 9 can be set appropriately in accordance with an internal layout or configuration of the printer 100. Furthermore, a rotation angle of the cap 20 when subjected to the first release operation and an amount of movement of the cap 20 when performing the wiping operation can also be set appropriately as long as adhesion of ink to the side surfaces of the recording head 9 can be suppressed.

Furthermore, while the foregoing embodiments have described, as the inkjet recording apparatus, a color printer that uses ink of four different colors to record a color image, the present disclosure is applicable also to a monochrome printer that uses black ink to record a monochrome image.

The present disclosure is usable in an inkjet recording apparatus such as an inkjet printer.

What is claimed is:

1. An inkjet recording apparatus, comprising:

a recording head having a nozzle surface in which a plurality of nozzles for ejecting ink are formed;

a cap that is detachably attached to the nozzle surface of the recording head;

a suction portion that performs a suction purge process of applying suction to a sealed space between the cap attached to the nozzle surface and the nozzle surface so that the ink in the plurality of nozzles is sucked out; and a control portion that controls an operation of attaching the cap to the nozzle surface and detaching the cap therefrom, wherein the cap includes:

a rectangular bottom surface that is to be opposed at a prescribed distance to the nozzle surface; and side walls that are provided to stand along four sides of the bottom surface and make contact at distal end parts thereof with the nozzle surface, and in detaching the cap from the nozzle surface, the control portion sequentially executes:

a first release operation in which, in a state where a lower positioned one of the side walls of the cap is in contact with the nozzle surface, others of the side walls of the cap are released from the nozzle surface;

a wiping operation in which, while the lower positioned one of the side walls of the cap is kept in contact with the nozzle surface, the cap is moved upward by a prescribed amount along a part of the nozzle surface; and a second release operation in which all the side walls of the cap are released from the nozzle surface.

2. The inkjet recording apparatus according to claim 1, wherein the lower positioned one of the side walls of the cap, which is positioned at a lower side of the cap when the cap is attached to the recording head, has an inclined surface formed at a distal end thereof by downwardly beveling an outer corner of the distal end.

3. The inkjet recording apparatus according to claim 2, wherein an angle of the inclined surface with respect to a horizontal plane is equal to a rotation angle of the cap rotated in the first release operation.

4. The inkjet recording apparatus according to claim 1, wherein the lower positioned one of the side walls of the cap, which is positioned at a lower side of the cap when the cap is attached to the recording head, has a curved surface formed at a distal end thereof by rounding an inner corner of the distal end into an arc shape as viewed in cross section.

5. The inkjet recording apparatus according to claim 1, wherein an ink absorber made of a porous material is arranged on an inner side of the cap along the bottom surface.

* * * * *